United States Patent
Hirota et al.

(10) Patent No.: US 10,545,170 B2
(45) Date of Patent: Jan. 28, 2020

(54) MEASURING METHOD OF SCANNING PROBE MICROSCOPY USING PENETRATIVE PRESSING FORCE

(71) Applicant: TOSHIBA MEMORY CORPORATION, Tokyo (JP)

(72) Inventors: Jun Hirota, Kanagawa (JP); Kazunori Harada, Kanagawa (JP); Tsukasa Nakai, Mie (JP)

(73) Assignee: Toshiba Memory Corporation, Tokyo (JP)

( * ) Notice: Subject to any disclaimer, the term of this patent is extended or adjusted under 35 U.S.C. 154(b) by 829 days.

(21) Appl. No.: 15/067,628

(22) Filed: Mar. 11, 2016

(65) Prior Publication Data

US 2016/0377651 A1 Dec. 29, 2016

Related U.S. Application Data

(60) Provisional application No. 62/183,214, filed on Jun. 23, 2015.

(51) Int. Cl.
 *G01Q 60/30* (2010.01)
 *G01Q 10/06* (2010.01)

(52) U.S. Cl.
 CPC ........... *G01Q 60/30* (2013.01); *G01Q 10/06* (2013.01)

(58) Field of Classification Search
 CPC ...... G01Q 60/30; G01Q 10/06; G01Q 60/363; G01Q 90/00
 See application file for complete search history.

(56) References Cited

U.S. PATENT DOCUMENTS

| 5,224,376 | A | * | 7/1993 | Elings | G01Q 60/363 |
| | | | | | 850/33 |
| 5,347,854 | A | * | 9/1994 | Martin | G01Q 10/06 |
| | | | | | 850/33 |

(Continued)

FOREIGN PATENT DOCUMENTS

JP    2011-209072    10/2011

OTHER PUBLICATIONS

De Wolf, Peter & Brazel, E & Erickson, A. (2001). Electrical characterization of semiconductor materials and devices using scanning probe microscopy. Materials Science in Semiconductor Processing. 4. 71-76. 10.1016/S1369-8001(00)00174-8.*

*Primary Examiner* — Brooke Purinton
(74) *Attorney, Agent, or Firm* — Finnegan, Henderson, Farabow, Garrett & Dunner, L.L.P.

(57) ABSTRACT

A measuring method of a scanning probe microscopy moves the probe from the first measuring point to the second measuring point while the probe has contact with the object to be measured and a pressing force weaker than the first pressing force is applied between the probe and the object to be measured after the measurement at the first measuring point has ended, applies the first pressing force between the probe and the object to be measured until the tip end position of the probe reaches the first distance in the depth direction from the upper surface of the object to be measured, and measures the physical property information of the object to be measured after the tip end position of the probe has reached the first distance in the depth direction from the upper surface of the object to be measured at the second measuring point.

20 Claims, 5 Drawing Sheets

(56) References Cited

U.S. PATENT DOCUMENTS

| | | | | |
|---|---|---|---|---|
| 5,585,734 A | * | 12/1996 | Meuris | G01R 27/00 |
| | | | | 324/454 |
| 6,201,401 B1 | * | 3/2001 | Hellemans | G01Q 60/30 |
| | | | | 257/E21.531 |
| 6,520,005 B2 | * | 2/2003 | McWaid | G01Q 60/34 |
| | | | | 73/105 |
| 2015/0059025 A1 | | 2/2015 | Shinomiya et al. | |
| 2016/0290945 A1 | * | 10/2016 | Watanabe | G01Q 60/30 |

* cited by examiner

MEASURING METHOD OF SCANNING PROBE MICROSCOPY USING PENETRATIVE PRESSING FORCE

CROSS REFERENCE TO RELATED APPLICATIONS

This application is based upon and claims the benefit of priority from the prior U.S. Provisional Patent Application No. 62/183,214 filed on Jun. 23, 2015, the entire contents of which are incorporated herein by reference.

FIELD

One aspect of the present invention relates to a measuring method of a scanning probe microscopy.

BACKGROUND

The scanning probe microscopy (SPM) is used to measure a carrier concentration distribution of a semiconductor device. Since the measured result is changed according to a contact state of a probe provided at a tip end of a cantilever with an object to be measured, regarding the SPM; it is necessary to strongly press the probe against the object to be measured. Therefore, the probe is abraded, and abrasion powders are generated. When the abrasion powders enter between the probe and the object to be measured, a contact resistance increases.

As a method for reducing the abrasion powder in a case where physical property information is measured at a plurality of places of the object to be measured, there is a method in which after the measurement has been performed by pressing the probe against the object to be measured at a measuring point, the probe is held above the object to be measured and moved to the next measuring point, and the cantilever is pressed against the object to be measured again.

However, when the probe is completely separated from the object to be measured at every measurement, the measured results are largely varied by a position shift caused at the time when the cantilever is positioned at the next measuring point. Also, there is a problem in that it takes time to position the probe and thus a measurement throughput is lowered.

DETAILED DESCRIPTION

According to one embodiment, a measuring method of a scanning probe microscopy positions a probe at a first measuring point of an object to be measured, applies a first pressing force between the probe and the object to be measured until a tip end position of the probe reaches a first distance in a depth direction from a upper surface of the object to be measured at the first measuring point, measures physical property information of the object to be measured after the tip end position of the probe has reached the first distance in the depth direction from the upper surface of the object to be measured at the first measuring point, moves the probe from the first measuring point to the second measuring point while the probe has contact with the object to be measured and a pressing force weaker than the first pressing force is applied between the probe and the object to be measured after the measurement at the first measuring point has ended, applies the first pressing force between the probe and the object to be measured until the tip end position of the probe reaches the first distance in the depth direction from the upper surface of the object to be measured when the probe has reached the second measuring point, and measures the physical property information of the object to be measured after the tip end position of the probe has reached the first distance in the depth direction from the upper surface of the object to be measured at the second measuring point.

A scanning probe microscopy according to one embodiment will be described below with reference to the drawings.

Figure 1:
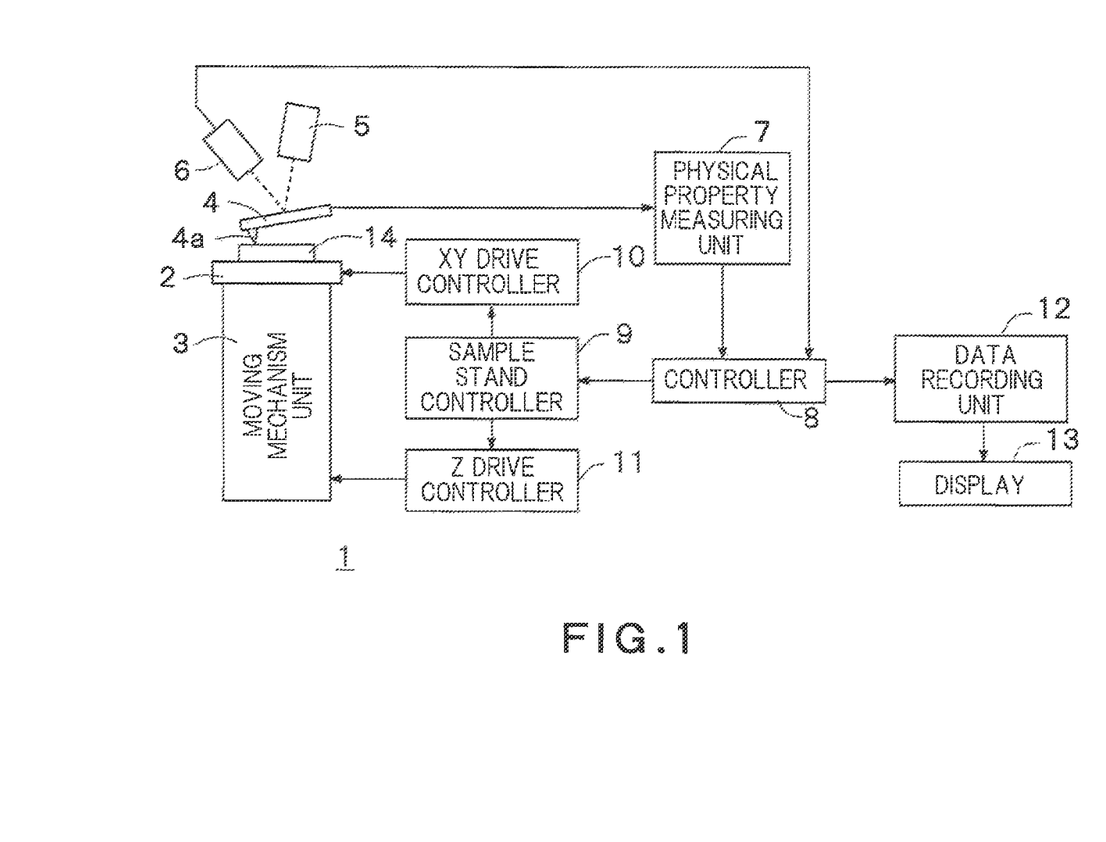
FIG. 1 is a block diagram of an outline structure of a scanning probe microscopy according to one embodiment.

FIG. 1 is a block diagram of an outline structure of a scanning probe microscopy 1 according to one embodiment. The scanning probe microscopy 1 in FIG. 1 includes a sample stand 2, a moving mechanism unit 3, a cantilever 4, a light source 5, an optical detector 6, a physical property measuring unit 7, a controller 8, a sample stand controller 9, an XY drive controller 10, a Z drive controller 11, a data recording unit 12, and a display 13.

An object to be measured 14 is placed on the sample stand 2. The sample stand 2 can be moved in a two-dimensional direction XY along a surface of the sample stand 2 by the moving mechanism unit 3 and can be moved in a normal direction Z of the surface of the sample stand 2. The moving mechanism unit 3 is driven and controlled by the sample stand controller 9, The moving mechanism unit 3 can be configured of, for example, a cylindrical piezo-scanner.

For example, as illustrated in FIG. 1, one end side of the cantilever 4 in the longitudinal direction is rotatably supported. A pointed probe 4a is provided at another end side in the longitudinal direction. When the object to be measured 14 on the sample stand 2 is pressed against the probe 4a, a pressing force changes an inclination angle of the cantilever 4. The light source 5 which emits a laser beam to an upper surface of the cantilever 4 is provided above the cantilever 4. The upper surface of the cantilever 4 is a reflection surface, and the laser beam reflected by the upper surface of the cantilever 4 is received by the optical detector 6. The optical detector 6 includes, for example, photodiodes divided into a plurality and can detect a change amount of the cantilever 4, that is, the pressing force for pressing the object to be measured 14 by the probe 4a based on a difference between the light receiving amounts of the respective photodiodes.

The physical property measuring unit 7 measures physical property information on the object to be measured 14 by contacting the probe 4a with the object to be measured 14. For example, the physical property information is electric characteristics such as a resistance value of the object to be measured 14, an electrostatic capacity, a dielectric constant, a polarization state, a viscoelastic force, and an attracting force. Alternatively, the physical property information may be magnetic characteristics such as a magnetic field distribution of the object to be measured 14. The physical property information of the cantilever 4 can be measured based on an electrical signal obtained from the cantilever 4 and a change amount and a change direction of the cantilever 4.

The controller 8 instructs the sample stand controller 9 to move the sample stand 2 in the three dimensional direction based on the measured result of the physical property measuring unit 7. The sample stand controller 9 instructs the XY drive controller 10 to move the sample stand 2 in the XY direction and instructs the Z drive controller 11 to move the sample stand 2 in the Z direction in order to position the probe 4a to a specific point in the sample stand 2. The pressing force of the probe 4a can be adjusted by moving the sample stand 2 in the Z direction.

The XY drive controller 10 performs control for moving the sample stand 2 in the two-dimensional direction XY along the surface of the sample stand 2. The Z drive controller 11 performs control for moving the sample stand 2 in the normal direction Z of the surface of the sample stand 2.

The data recording unit 12 records the physical property information measured by the physical property measuring unit 7. The physical property information recorded in the data recording unit 12 is displayed on the display 13 as necessary.

Figure 2:
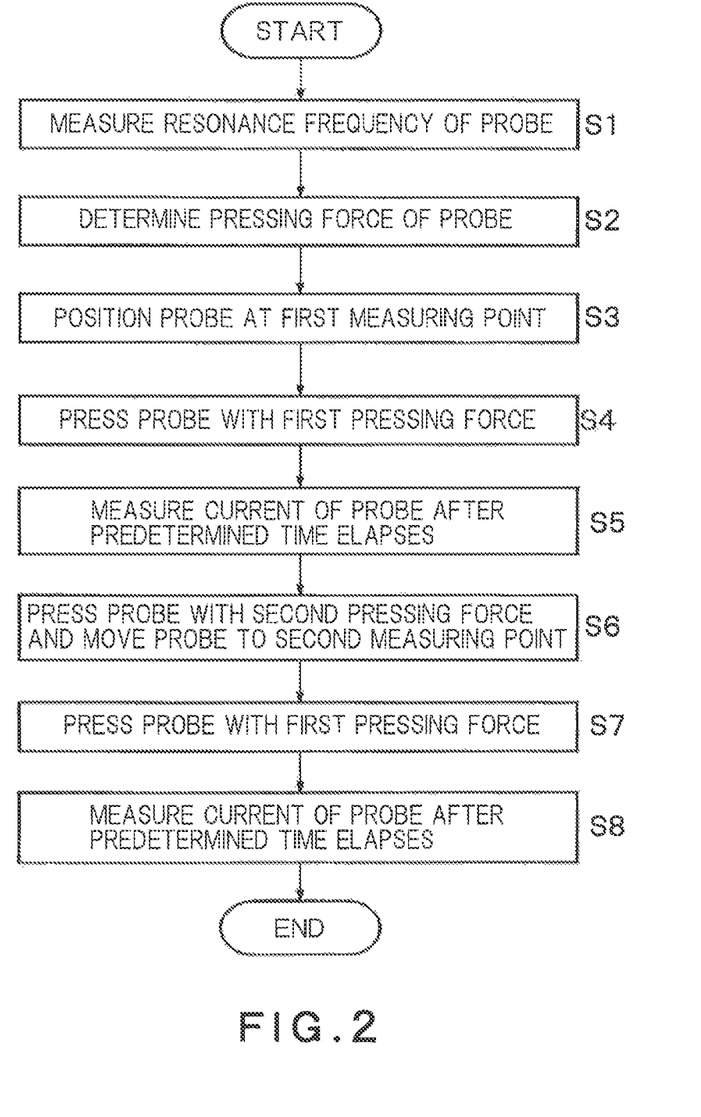
FIG. 2 is a flowchart of an exemplary processing operation performed by a controller in FIG. 1.
Figure 3:
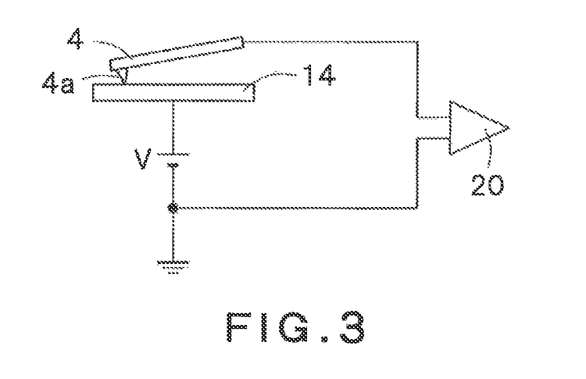
FIG. 3 is a schematic diagram of measurement of a resistance value of an object to be measured by the scanning probe microscopy in FIG. 1.

FIG. 2 is a flowchart of an exemplary processing operation performed by the controller 8 in FIG. 1. The flowchart expresses the processing operation in a case where the resistance value of the object to be measured 14 is measured at a plurality of measuring points on the object to be measured 14. FIG. 3 is a schematic diagram of measurement of the resistance value of the object to be measured 14 by the scanning probe microscopy 1 in FIG. 1. The probe 4a is contacted with the measuring point on the upper surface of the object to be measured 14, and also, a predetermined bias voltage V is applied to a side of a rear surface of the object to be measured 14. Accordingly, the bias voltage V is concentrated at a part just under the probe 4a, and a current correlated with an impurity concentration distribution in the object to be measured 14 just under the probe 4a flows into the probe 4a. The resistance value at the measuring point can be detected by amplifying the current by an amplifier 20. The local resistance value of the probe 4a is also referred to as a spread resistance. By measuring the resistance values at the plurality of points in the object to be measured 14, the impurity concentration distribution in the object to be measured 14 can be accurately measured. The scanning probe microscopy 1 to measure the spread resistance is referred to as a scanning spread resistance microscope (SSRM). In the flowchart in FIG. 2, the processing operation performed by the SSRM is illustrated.

In the flowchart in FIG. 2, first, a resonance frequency of the probe 4a is measured (step S1). Here, for example, the resonance frequency of the probe 4a is measured by changing a frequency of a high frequency voltage to be applied to the probe 4a.

Next, a spring constant of the probe 4a is detected based on the detected resonance frequency, and the pressing force of the probe 4a at the time of measurement is determined based on the detected spring constant (step S2). The pressing force is different according to the kind of the object to be measured 14. For example, when the object to be measured 14 is silicon, the pressing force is set to be a value equal to or less than 10 μN. Also, when the object to be measured 14 is a compound semiconductor and SiC, since the compound semiconductor and SiC are harder than silicon, the pressing force is set to be a larger value than that in a case of silicon.

It has been known that the following formula (1) is satisfied between an abrasion degree W of the probe 4a, a pressing force P of the probe 4a, a hardness H of the probe 4a, and a slipping velocity V of the probe 4a. The formula (1) is referred to as the Model of Archard's equation. The value K in the formula (1) is a coefficient, and $K \approx 5.96 \times 10^{-6}$. Also, for example, constants a and b are one, and a constant c is set to be two.

$$W = \int K \frac{P^a V^b}{H^c} dt \quad (1)$$

As illustrated in the formula (1), it is desirable that at least one of the pressing force P and the slipping velocity V of the probe 4a is reduced in order to reduce the abrasion degree W of the probe 4a. When the pressing force P is reduced, there is a possibility that the resistance value of the object to be measured 14 cannot be accurately detected. Therefore, in step S2, the pressing force P is determined to obtain the abrasion degree W to be a target while the hardness H and the slipping velocity V of the probe 4a are considered. The pressing force determined in step S2 will be referred to as a first pressing force below.

Next, the probe 4a is positioned at a first measuring point on the object to be measured 14 (step S3). Here, the sample stand controller 9 recognizes the position of the sample stand 2 in the three dimensional direction and instructs a driving amount of the sample stand 2 to the XY drive controller 10 and the Z drive controller 11.

The scanning probe microscopy 1 in FIG. 1 moves the sample stand 2 in the three dimensional direction and positions the probe 4a at the first measuring point on the sample stand 2. However, the position of the sample stand 2 is fixed, and the cantilever 4 may be positioned by moving it in the three dimensional direction. In addition, the cantilever 4 may be positioned by moving the sample stand 2 in the two-dimensional direction XY and moving the cantilever 4 in the Z direction. Also, the cantilever 4 may be positioned by moving the cantilever 4 in the two-dimensional direction XY and moving the sample stand 2 in the Z direction.

When the cantilever 4 is positioned at the first measuring point, the probe 4a is pressed against the object to be measured 14 with the first pressing force determined in step S2 (step S4). When the probe 4a is pressed against the object to be measured 14 with the first pressing force, the probe 4a is moved to a first distance in the depth direction from the upper surface of the object to be measured 14. That is, the probe 4a enters into the object to be measured 14.

When a predetermined time elapses after the probe 4a has been pressed against the object to be measured 14 with the first pressing force, a current flowing in the cantilever 4 is measured (step S5). Here, the predetermined time is time until the current flowing in the cantilever 4 is stabilized. Immediately after the probe 4a is pressed against the object to be measured 14 with the first pressing force, the current flowing in the cantilever 4 is largely changed, and the resistance value cannot be accurately measured. Therefore, in step S5, the scanning probe microscopy 1 waits for a predetermined time until the resistance value is accurately measured.

Next, as contacting the probe 4a with the object to be measured 14 and pressing the probe 4a with a second pressing force weaker than the first pressing force, the probe 4a is moved from the first measuring point to a second measuring point (step S6).

In this way, in the present embodiment, when the cantilever 4 is moving, the probe 4a is not separated from the object to be measured 14, and the pressing force of the probe 4a is made to be weaker than that at the time of the measurement.

Figure 4:
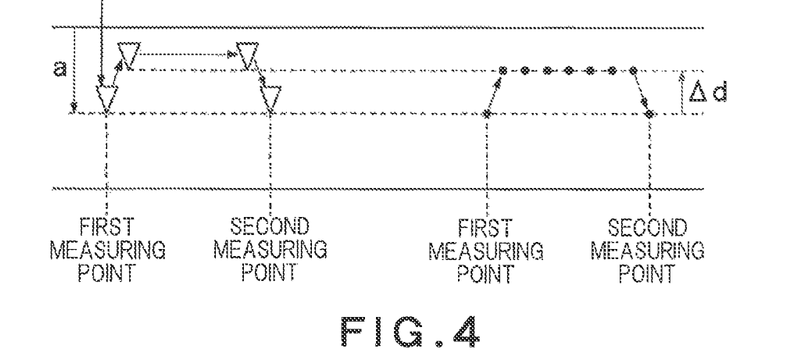
FIG. 4 is a diagram of a positional change of a probe.

FIG. 4 is a diagram of a positional change of the probe 4a. In the diagram on the left side of FIG. 4, the positional change of the probe 4a is schematically illustrated. In the diagram on the right side of FIG. 4, a moving locus of the probe 4a is indicated by a plot.

In FIG. 4, it is assumed that the depth from the upper surface of the object to be measured 14 to the probe 4a at the time when the probe 4a is pressed at the first measuring point of the object to be measured 14 in step S4 in FIG. 2 (first distance) be a. After that, when the cantilever 4 is moved from the first measuring point to the second measuring point, the cantilever 4 is moved as contacting it with the object to be measured 14, and the pressing force for pressing the probe 4a against the object to be measured 14 is weakened from the first pressing force to the second pressing force. Accordingly, the depth of the probe 4a during the movement of the cantilever 4 is less than that at the first measuring point. In FIG. 4, an example is illustrated in which the probe 4a is positioned above the depth a at the first measuring point by Δd when the cantilever 4 is moving. However, a >Δd is satisfied, and the probe 4a stays in the object to be measured 14 without separating from the object to be measured 14.

In this way, the probe 4a is kept in the object to be measured 14 when the cantilever 4 is moving between the measuring points. The reason of this is because it is difficult to accurately position the probe 4a at the next measuring point and the measured results are largely varied when the probe 4a is once separated from the object to be measured 14. Also, there is a problem in that a measurement throughput is lowered when it takes time to position the probe 4a. As in the present embodiment, in a case where the probe 4a constantly stays in the object to be measured 14 when the cantilever 4 is moving between the measuring points, the probe 4a can be moved to the next measuring point to be the target in a short time, and the accuracy of the positioning is improved.

When the probe 4a is moved to the second measuring point while the first pressing force of the time of measuring the physical property information such as the resistance value at the first measuring point is maintained, the probe 4a is moved in a surface direction of the sample stand 2 as the first pressing force is applied to the probe 4a. Therefore, the abrasion of the probe 4a is promoted, and an abrasion powder amount increases. When the abrasion powders are accumulated around the probe 4a, the contact resistance is increased, and there is a possibility that the resistance value of the object to be measured 14 cannot be accurately measured.

Therefore, in the present embodiment, the cantilever 4 is moved with the second pressing force smaller than the first pressing force at the time of measuring the physical property information such as the resistance value at the measuring point. Accordingly, the abrasion of the probe 4a during the movement of the cantilever 4 and the generation of the abrasion powder amount can be prevented.

When the cantilever 4 reaches the second measuring point, the probe 4a is pressed against the object to be measured 14 with the first pressing force (step S7). When a predetermined time elapses as maintaining the pressing force, the current flowing in the cantilever 4 is measured (step S8).

After that, when the physical property information such as the resistance value is measured at a different measuring point, processing similar to the above-mentioned steps S6 to S8 is repeated.

It is preferable that the position of the probe 4a at the time of moving the cantilever 4 between the measuring points be higher than the depth position of the first measuring point and be lower than the upper surface of the object to be measured 14. For example, when the object to be measured 14 is silicon, the pressing force of the probe 4a at the time of measurement is set to be equal to or less than 10 μN, and the pressing force of the probe 4a at the time of movement is set to be equal to or more than 500 μN. When the kind of the object to be measured 14 and the kind of the probe 4a are changed, it is necessary to change the pressing force according to the change. When the pressing force of the probe 4a at the time of the movement is too weak, there is a possibility that the probe 4a is separated from the object to be measured 14. On the other hand, when the pressing force of the probe 4a at the time of the movement is too strong, the abrasion of the probe 4a is promoted, and the abrasion powder amount is increased. Therefore, it is desirable that the pressing force of the probe 4a at the time of the movement be set to be an optimal value in consideration of the materials of the probe 4a and the object to be measured 14.

In FIG. 4, when the measurement at each measuring point ends, the pressing force is weakened to the second pressing force in a relatively short time. Then, the probe 4a is moved upwards by a second distance Δd from the first distance, and the depth position of the probe 4a is determined. After that, as the determined depth position is maintained, the probe 4a is moved to the second measuring point. When the probe 4a reaches the second measuring point, the pressing force of the probe 4a is increased to the first pressing force, and the probe 4a is moved downwards from the upper surface of the object to be measured 14 to the depth position of the first distance.

In this way, in FIG. 4, in almost all the moving processes of the cantilever 4, the depth position of the probe 4a is constant, and the pressing force is also constant. Therefore, the abrasion of the probe 4a at the time when the cantilever 4 is moving can be efficiently reduced.

Figure 5:
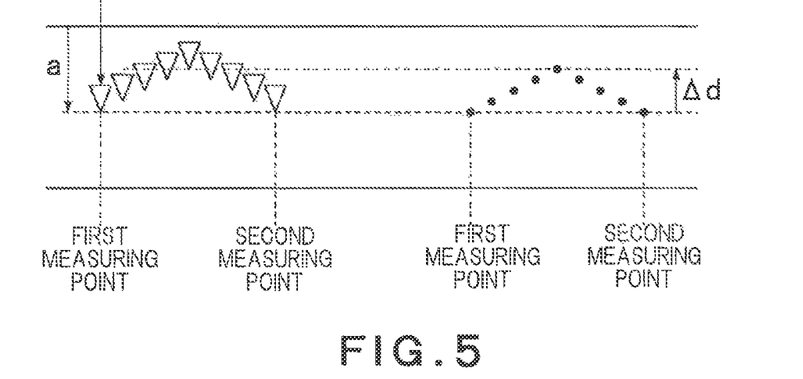
FIG. 5 is a diagram of a modification of FIG. 4.

The positional change of the probe 4a is not limited to the one illustrated in FIG. 4. FIG. 5 is a diagram of a modification of FIG. 4. In FIG. 5, an example is illustrated in which the pressing force of the probe 4a is continuously changed or is changed in stages when the cantilever 4 is moving. More specifically, the pressing force is continuously weakened or is weakened in stages from the first pressing force at the first measuring point to the second pressing force. Accordingly, the depth of the probe 4a is continuously reduced or is reduced in stages from the first distance.

When the pressing force of the probe 4a reaches the second pressing force, the pressing force is continuously increased or increased in stages. According to this, the depth of the probe 4a is gradually increased. When the cantilever 4 has reached the second measuring point, the pressing force of the probe 4a is set to be the first pressing force, and the depth is set to be the first distance.

In a case of FIG. 5, while the pressing force of the cantilever 4 is changed, the cantilever 4 is moved. Then, when the cantilever 4 has reached the next measuring point, the first pressing force is applied to the probe 4a. Therefore, the measurement can be more promptly started.

The positional change of the probe 4a at the time when the cantilever 4 is moving is not limited to the ones illustrated in FIGS. 4 and 5. For example, the depth position may be controlled so that the moving locus of the probe 4a forms a rectangle and a polygon, and the depth position may be controlled so that the moving locus forms a curved line.

Figure 6:
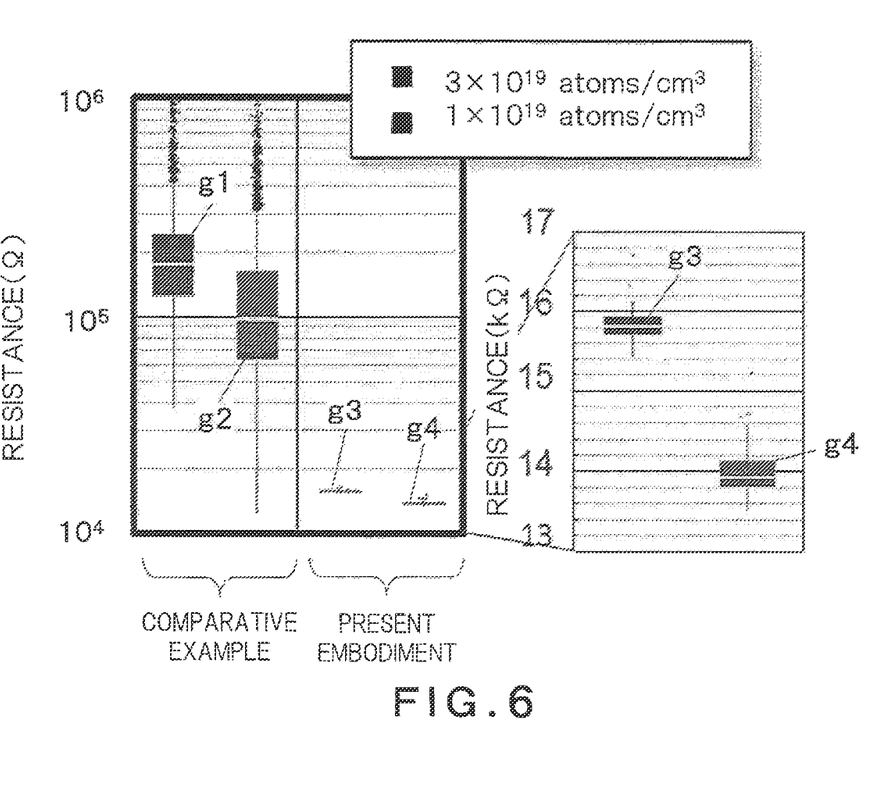
FIG. 6 is a graph in which measured result of the resistance values of the object to be measured according to the present embodiment is compared with a comparative example.

FIG. 6 is a graph in which variety of the measured results of the resistance values of the object to be measured 14 in the present embodiment is compared with that of the comparative example. In the comparative example, the probe 4a is retracted upwards from the upper surface of the object to be measured 14 after the measurement at each measuring point ends. The vertical axis of FIG. 6 indicates the resistance value, and graphs g1 to g4 indicate a range of the variation of the resistance values.

The graphs g1 and g2 in FIG. 6 indicate the measured result according to the present embodiment, and the graphs g3 and g4 indicate the measured result according to the comparative example. Also, in the graphs g5 and g6, intervals of scales of the resistance value [Ω] on the vertical axis of the graphs g1 and g2 are widened.

The graphs g1 and g3 indicate variation of the resistance values of the object to be measured 14 in which phosphorus with the impurity concentration distribution of $1 \times 10^{19}$ cm$^{-3}$ is ion implanted on the silicon substrate, and the graphs g2 and g4 indicate variation of the resistance values of the object to be measured 14 in which phosphorus with the impurity concentration distribution of $3 \times 10^{19}$ cm$^{-3}$ is ion implanted on the silicon substrate.

As understood by comparing the graphs g1 and g2 with the graphs g3 and g4, according to the present embodiment, positioning error at each measuring point is reduced. Therefore, the variation of the resistance values becomes very smaller than that of the comparative example.

As described above, in the measuring method of the scanning probe microscopy according to the present embodiment, the probe is positioned at the first measuring point of the object to be measured. At the first measuring point, the first pressing force is applied between the probe and the object to be measured until the tip end position of the probe reaches the first distance in the depth direction from the upper surface of the object to be measured. After the tip end position of the probe has reached the first distance in the depth direction from the upper surface of the object to be measured at the first measuring point, the physical property information of the object to be measured is measured. After the measurement at the first measuring point has ended, the probe, is moved from the first measuring point to the second measuring point while the probe has contact with the object to be measured and the pressing force weaker than the first pressing force is applied between the probe and the object to be measured. When the probe reaches the second measuring point, the first pressing force is applied between the probe and, the object to be measured until the tip end position of the probe reaches the first distance in the depth direction from the upper surface of the object to be measured. After the tip end position of the probe has reached the first distance in the depth direction from the upper surface of the object to be measured at the second measuring point, the physical property information of the object to be measured is measured.

That is, in the measuring method of the scanning probe microscopy according to the present embodiment, the probe is positioned at the first measuring point of the object to be measured. At the first measuring point, the tip end position of the probe is positioned at the first distance in the depth direction from the upper surface of the object to be measured. After the tip end position of the probe has reached the first distance in the depth direction from the upper surface of the object to be measured at the first measuring point, the physical property information of the object to be measured is measured. After the measurement at the first measuring point has ended, the probe is moved from the first measuring point to the second measuring point while the probe has contact with the object to be measured. When the probe reaches the second measuring point, the tip end position of the probe is positioned at the first distance in the depth direction from the upper surface of the object to be measured. After the tip end position of the probe has reached the first distance in the depth direction from the upper surface of the object to be measured at the second measuring point, the physical property information of the object to be measured is measured.

Figure 7:
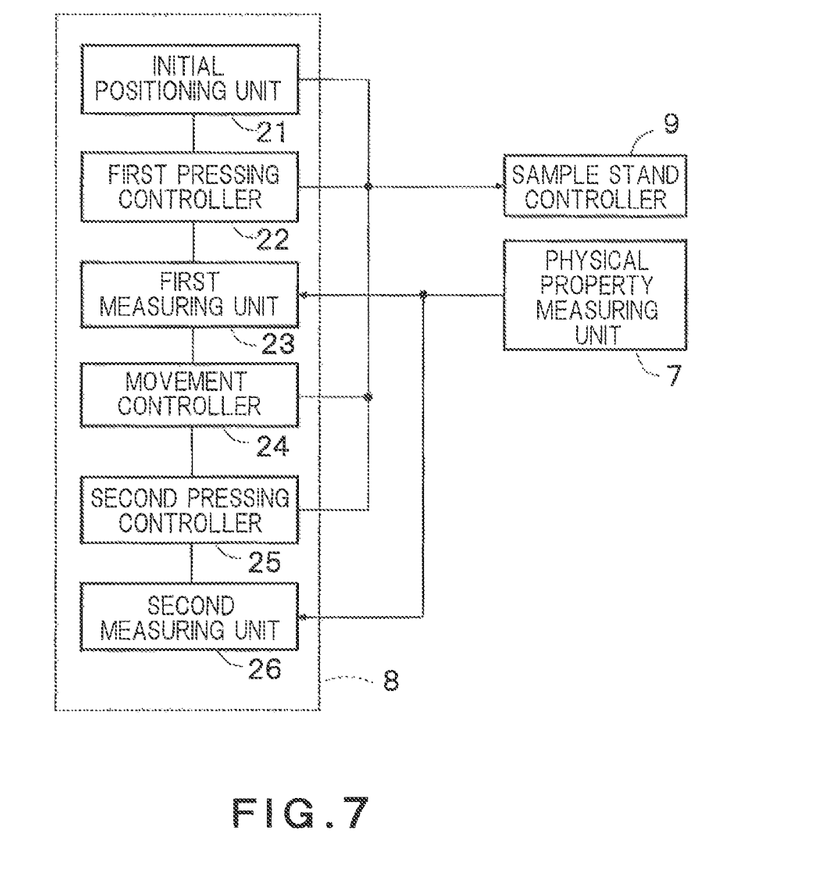
FIG. 7 is a block diagram of an exemplary inner structure of the controller (control device) in FIG. 1.

FIG. 7 is a block diagram of an exemplary inner structure of the controller (control device) 8 in FIG. 1. In at least a part of the inner structure of the controller 8 illustrated in FIG. 7, either one of hardware or software may be mounted.

The controller 8 in FIG. 7 includes an initial positioning unit 21, a first pressing controller 22, a first measuring unit 23, a movement controller 24, a second pressing controller 25, and a second measuring unit 26. The initial positioning unit 21, the first pressing controller 22, the movement controller 24, and the second pressing controller 25 instruct the sample stand controller 9 in FIG. 1 to move the sample stand 2. The first measuring unit 23 and the second measuring unit 26 obtain the physical property information measured by the physical property measuring unit 7 in FIG. 1.

The initial positioning unit 21 positions the probe at the first measuring point of the object to be measured. The first pressing controller 22 applies the first pressing force between the probe and the object to be measured at the first measuring point until the tip end position of the probe reaches the first distance in the depth direction from the upper surface of the object to be measured. The first measuring unit 23 measures the physical property information of the object to be measured after the tip end position of the probe has reached the first distance in the depth direction from the upper surface of the object to be measured at the first measuring point. After the measurement at the first measuring point has ended, the movement controller 24 moves the probe from the first measuring point to the second measuring point while the probe has contact with the object to be measured and the pressing force weaker than the first pressing force is applied between the probe and the object to be measured. When the probe reaches the second measuring point, the second pressing controller 25 applies the first pressing force between the probe and the object to be measured until the tip end position of the probe reaches the first distance in the depth direction from the upper surface of the object to be measured. The second measuring unit 26 measures the physical property information of the object to be measured after the tip end position of the probe has reached the first distance in the depth direction from the upper surface of the object to be measured at the second measuring point.

In this way, in the present embodiment, when the cantilever 4 is moving between the measuring points, the cantilever 4 is moved so that the pressing force is set to be the second pressing force weaker than the pressing force (first pressing force) of the probe 4a at the measuring point and the probe 4a stays in the object to be measured 14. Accordingly, the abrasion of the probe 4a during the movement of the cantilever 4 can be prevented. Also, since the positioning to the next measuring point can be promptly performed, the variation in the measurement of the physical property information of the object to be measured 14 can be reduced, and accuracy of the measurement and the measurement throughput can be improved.

In the embodiment, the SSRM measurement for measuring the resistance value of the object to be measured 14 by the scanning probe microscopy 1 has been described as an example. However, the present embodiment can be applied to a case where other physical property information such as the electrostatic capacity of the object to be measured 14 is measured. However, there is a possibility that the optimal pressing force to be applied to the probe 4a at the time of measurement is different according to the physical property information to be measured. Also, the optimal pressing force to be applied to the probe 4a is different according to the material of the object to be measured 14. Therefore, it is desirable that the first pressing force and the second pressing force at the time of measurement and movement be set by totally considering the material of the object to be measured 14 and the physical property information to be measured.

In this way, the scanning probe microscopy 1 according to the present embodiment can be applied to the scanning spread resistance microscope (SSRM). In addition, the scanning probe microscopy 1 can be applied to various electric measurements having an atomic force microscope (AFM) as a base, and specifically, can be applied to a scanning capacitance microscope (SCM), a scanning microwave microscopy (SIAM), and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A measuring method of a scanning probe microscopy, comprising:
    positioning a probe at a first measuring point of an object to be measured;
    applying a first pressing force between the probe and the object to be measured until a tip end position of the probe reaches a first distance in a depth direction from an upper surface of the object to be measured at the first measuring point;
    measuring physical property information of the object to be measured after the tip end position of the probe has reached the first distance in the depth direction from the upper surface of the object to be measured at the first measuring point;
    moving the probe from the first measuring point to the second measuring point while the probe has contact with the object to be measured and a second pressing force weaker than the first pressing force is applied between the probe and the object to be measured after the measurement at the first measuring point has ended;
    increasing a pressing force applied between the probe and the object to be measured from the second pressing force to the first pressing force until the tip end position of the probe reaches the first distance in the depth direction from the upper surface of the object to be measured when the probe has reached the second measuring point; and
    measuring the physical property information of the object to be measured after the tip end position of the probe has reached the first distance in the depth direction from the upper surface of the object to be measured at the second measuring point.

2. The measuring method according to claim 1, wherein when the probe is moved from the first measuring point to the second measuring point, the probe is moved from the first measuring point to the second measuring point in a state where the tip end position of the probe is positioned on a side nearer to the first measuring point than the upper surface of the object to be measured and positioned on a side nearer to the upper surface of the object to be measured than the tip end position of the probe at the first measuring point.

3. The measuring method according to claim 2, wherein when the probe is moved from the first measuring point to the second measuring point, the pressing force between the probe and the object to be measured is changed from the first pressing force to the second pressing force after the measurement of the physical property information at the first measuring point ends, and after that, the second pressing force is maintained until the probe reaches the second measuring point.

4. The measuring method according to claim 1, wherein when the probe is moved from the first measuring point to the second measuring point, the probe is placed on the side nearer to the first measuring point than the upper surface of the object to be measured, and the tip end position of the probe is continuously changed or is changed in stages in the depth direction.

5. The measuring method according to claim 4, wherein in the middle of moving the probe from the first measuring point to the second measuring point, the pressing force between the probe and the object to be measured is continuously changed or is changed in stages from the first pressing force to the second pressing force, and after that, the pressing force is continuously changed or is changed in stages from the second pressing force to the first pressing force, and the pressing force between the probe and the object to be measured is set to be the first pressing force when the probe has reached the second measuring point.

6. The measuring method according to claim 1, wherein the physical property information is a resistance value of the object to be measured.

7. The measuring method according to claim 1, wherein the physical property information of the object to be measured is measured after a predetermined time elapses from the time when the first pressing force is applied between the probe and the object to be measured at the first measuring point or the second measuring point.

8. The measuring method according to claim 1, wherein the position of the probe is fixed, and the pressing force applied between the probe and the object to be measured is switched to the first pressing force or the second pressing force by moving the object to be measured relative to the probe.

9. The measuring method according to claim 1, wherein the position of the object to be measured is fixed, and the pressing force applied between the probe and the object to be measured is switched to the first pressing force or the second pressing force by moving the probe relative to the object to be measured.

10. A measuring method of a scanning probe microscopy, comprising:
  positioning a probe at a first measuring point of an object to be measured;
  positioning a tip end position of the probe at a first distance in a depth direction from an upper surface of the object to be measured at the first measuring point;
  measuring physical property information of the object to be measured after the tip end position of the probe has reached the first distance in the depth direction from the upper surface of the object to be measured at the first measuring point;
  moving the probe from the first measuring point to a second measuring point while the probe has contact with the object to be measured after the measurement at the first measuring point has ended, on a state of moving the tip end position of the probe at a second distance in the depth direction from the upper surface of the object, the second distance being shorter than the first distance;
  positioning the tip end position of the probe at the first distance in the depth direction from the upper surface of the object to be measured when the probe reaches the second measuring point; and
  measuring the physical property information of the object to be measured after the tip end position of the probe has reached the first distance in the depth direction from the upper surface of the object to be measured at the second measuring point.

11. The measuring method according to claim 10, wherein when the probe is moved from the first measuring point to the second measuring point, the probe is moved from the first measuring point to the second measuring point in a state where the tip end position of the probe is positioned on a side nearer to the first measuring point than the upper surface of the object to be measured and positioned on a side nearer to the upper surface of the object to be measured than the tip end position of the probe at the first measuring point.

12. The measuring method according to claim 10, wherein when the probe is moved from the first measuring point to the second measuring point, the probe is placed on the side nearer to the first measuring point than the upper surface of the object to be measured, and the tip end position of the probe is continuously changed or is changed in stages in the depth direction.

13. The measuring method according to claim 10, wherein the physical property information is a resistance value of the object to be measured.

14. The measuring method according to claim 1, wherein the physical property information of the object to be measured is measured after a predetermined time elapses from the time when the tip end position of the probe has reached the first distance in the depth direction from the upper surface of the object to be measured at the first measuring point or the second measuring point.

15. The measuring method according to claim 10, wherein the position of the probe is fixed, and the tip end position of the probe in the depth direction from the upper surface of the object to be measured is switched by moving the object to be measured relative to the probe.

16. The measuring method according to claim 10, wherein the position of the object to be measured is fixed, and the tip end position of the probe in the depth direction from the upper surface of the object to be measured is switched by moving the probe relative to the object to be measured.

17. A control device of a scanning probe microscopy, comprising:
  an initial positioning unit to position a probe at a first measuring point of an object to be measured;
  a first pressing controller to apply a first pressing force between the probe and the object to be measured until a tip end position of the probe reaches a first distance in a depth direction from an upper surface of the object to be measured at the first measuring point;
  a first measuring unit to measure physical property information of the object to be measured after the tip end position of the probe has reached the first distance in the depth direction from the upper surface of the object to be measured at the first measuring point;
  a movement controller to move the probe from the first measuring point to a second measuring point while the probe has contact with the object to be measured and a second pressing force weaker than the first pressing force is applied between the probe and the object to be measured after the measurement at the first measuring point has ended;
  a second pressing controller to increase a pressing force applied between the probe and the object to be measured from the second pressing force to the first pressing force until the tip end position of the probe reaches the first distance in the depth direction from the upper surface of the object to be measured when the probe reaches the second measuring point; and
  a second measuring unit to measure the physical property information of the object to be measured after the tip end position of the probe has reached the first distance in the depth direction from the upper surface of the object to be measured at the second measuring point.

18. The control device according to claim 17, wherein when moving the probe from the first measuring point to the second measuring point, the movement controller moves the probe from the first measuring point to the second measuring point in a state where the tip end position of the probe is positioned on a side nearer to the first measuring point than the upper surface of the object to be measured and positioned on a side of the upper surface of the object to be measured than the tip end position of the probe at the first measuring point.

19. The measuring method according to claim 18, wherein when moving the probe from the first measuring point to the second measuring point, the movement controller changes a pressing force applied between the probe and the object to be measured from the first pressing force to the second pressing force after the measurement of the physical property information at the first measuring point ends, and after that, the movement controller maintains the second pressing force until the probe reaches the second measuring point.

20. The control device according to claim 17, wherein when moving the probe from the first measuring point to the second measuring point, the movement controller places the probe on the side nearer to the first measuring point than the upper surface of the object to be measured and continuously changes the tip end position of the probe in the depth direction or changes the tip end position of the probe in the depth direction in stages.

* * * * *